Dec. 2, 1924.   1,518,114
J. C. SHAW
ELECTRIC TRACER
Filed May 19, 1922   2 Sheets-Sheet 1
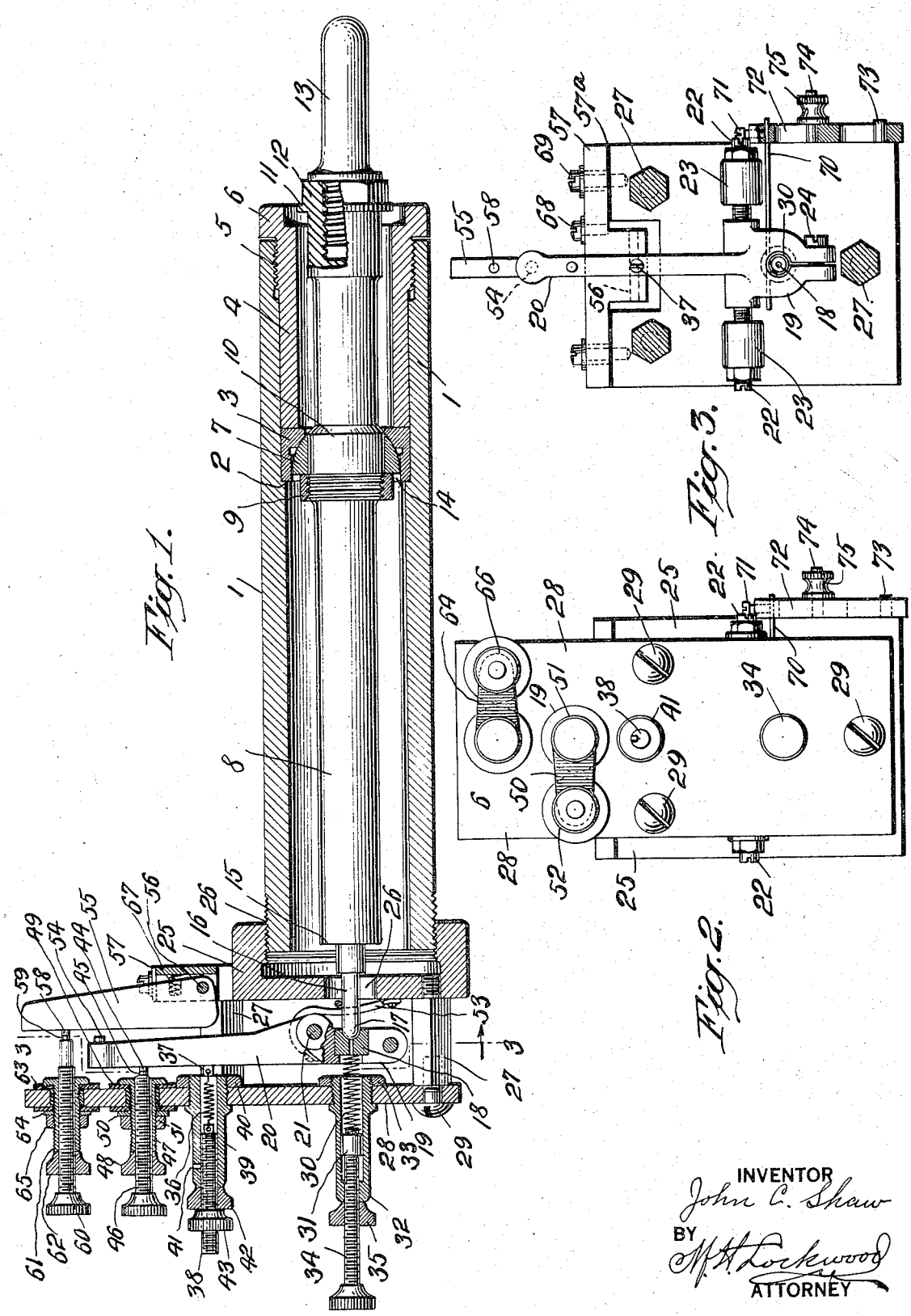
INVENTOR
John C. Shaw
BY
M. H. Lockwood
ATTORNEY Dec. 2, 1924.  
J. C. SHAW  
ELECTRIC TRACER  
Filed May 19, 1922

1,518,114

2 Sheets-Sheet 2

INVENTOR
John C. Shaw
BY
M. H. Lockwood
ATTORNEY

Patented Dec. 2, 1924.

1,518,114

UNITED STATES PATENT OFFICE.

JOHN C. SHAW, OF BROOKLYN, NEW YORK, ASSIGNOR TO KELLER MECHANICAL ENGINEERING CORPORATION, OF BROOKLYN, NEW YORK, A CORPORATION OF NEW YORK.

ELECTRIC TRACER.

Application filed May 19, 1922. Serial No. 562,228.

*To all whom it may concern:*

Be it known that I, JOHN C. SHAW, a citizen of the United States, and resident of Brooklyn, county of Kings, and State of New York, have invented certain new and useful Improvements in Electric Tracers, of which the following is a specification.

My invention relates more particularly to an improved electric tracer for use in connection with rotary magnetic clutches and suitable gear mechanism for electro-magnetically controlling the relative feed between the work and cutter, as the tracer follows the pattern, thereby reproducing the pattern on the work.

In my application, Ser. No. 356,766, filed February 6, 1920, an electric tracer operating through magnetic clutches and suitable feed mechanism is shown as adapted to control the relative movement between the cutter and die so as to reproduce the pattern in the die. However, in the form shown in the prior application, it has been found that the tracer is not sufficiently sensitive and, therefore, the control is not so accurate as may be desired.

Therefore, one object of my present improvement is to not only improve the mechanical construction of an electric tracer, but to so arrange the elements thereof that the action shall be more direct and hence produce a more sensitive instrument.

Another object is to improve the action of the tracer on the contact carrying bars, whereby contacts can be opened and closed with the least amount of movement on the part of the tracer point, thus rendering the tracer extremely sensitive so that very slight variations in the pattern will be readily reproduced in the work.

In my prior application, the electric tracer was shown in connection with a well-known type of engraving machine for duplicating designs from a pattern, but I have found that my improved electric tracer in connection with the magnetic clutch mechanism for controlling screw feeds or otherwise, substantially as shown in my prior application, above referred to, may be adapted for use in connection with planers, shapers, milling machines, lathes, slotters and other machines, wherein it may be desirable to reproduce work in duplication from a pattern. The type of electric tracer shown herewith may, therefore, be considered as representing a universal tracer, for electro-magnetic control in various types of machines, where accurate duplication of work is essential or desirable.

Figure 4:
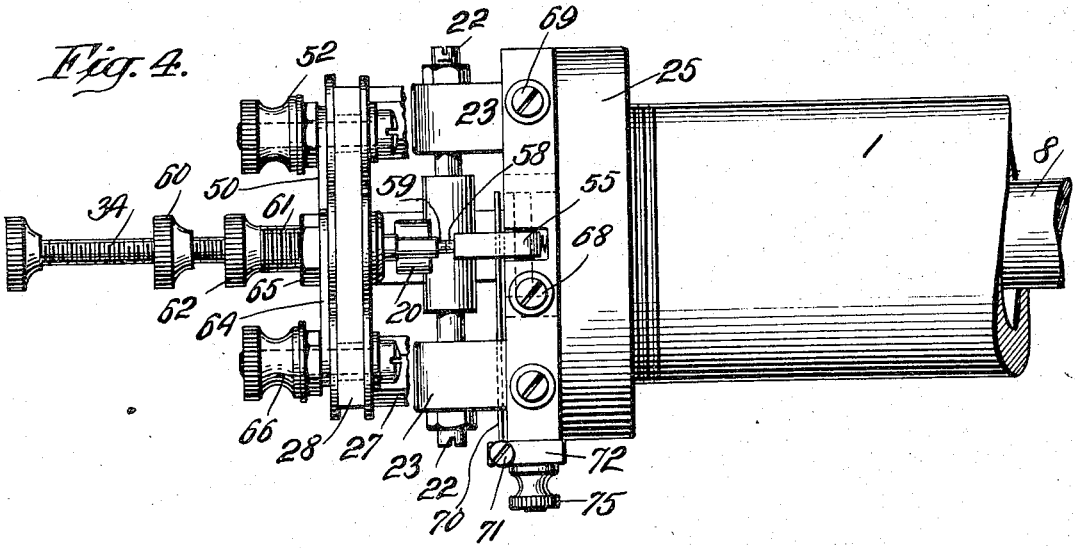
Figure 5:
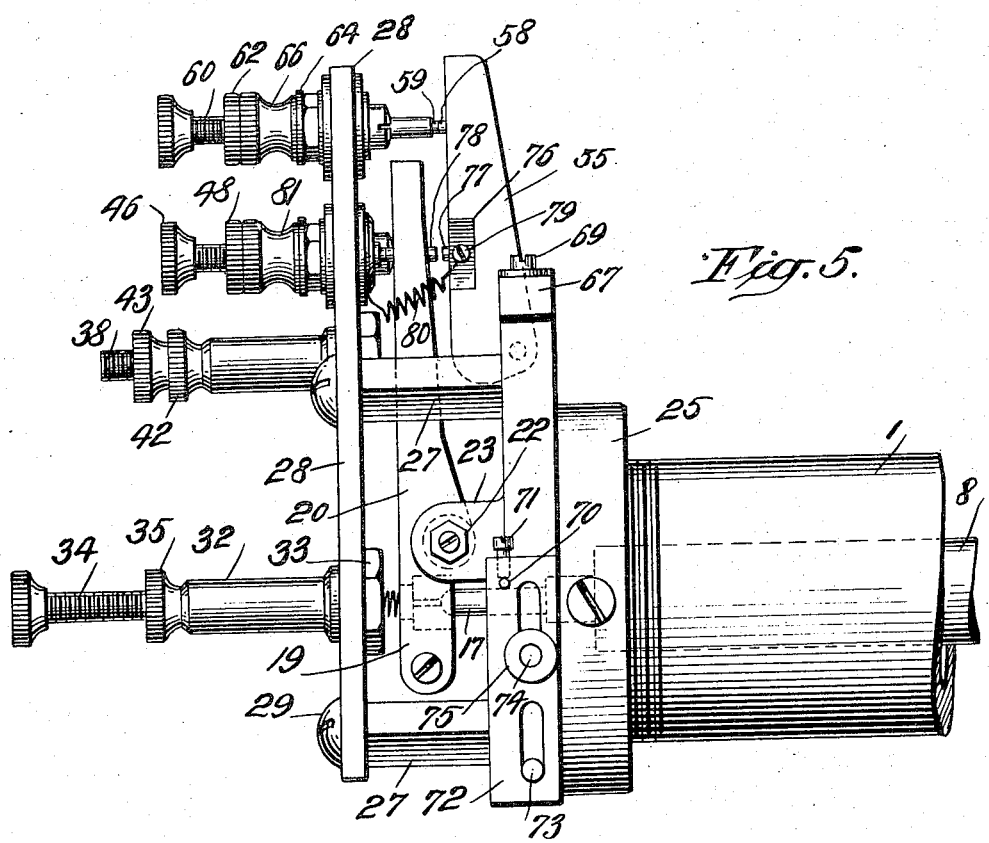

One form of my improved electric tracer is shown in the accompanying drawings, in which Fig. 1 is a longitudinal section of the tracer in side elevation; Fig. 2 is an end view looking toward the right in Fig. 1; Fig. 3 is an end view, with the end plate removed and parts in section along the line 3—3 of Fig. 1; Fig. 4 is a top plan view of the head of the tracer, the body portion being broken away, and Fig. 5 is a side elevation of the head portion of a tracer, in which the electrical contacts and connections are slightly modified.

Referring to the drawings, the supporting member or body portion 1 of the tracer is preferably tubular and the interior bore, at one end, is counterbored to form a seat at 2, for an annular bearing socket piece 3, the latter being preferably forced home and held in place by a tubular cylindrical screw plug 4 provided with a threaded portion at 5, cooperating with threads in the end of the tubular supporting member 1, as shown in Fig. 1 of the drawings. The right hand or outer end of the tubular plug 4 is preferably provided with a flange 6, extending to the outer diameter of the tubular support 1, which may serve as a head for screwing the plug into the barrel.

The annular socket bearing 3 is preferably substantially hemispherical and cooperates with an annular hemispherical bearing ring 7, to form a ball and socket bearing at the fulcrum of the tracer bar 8. The bearing ring 7 is mounted between the ends of the tracer bar 8, as will be seen in Fig. 1 of the drawings, and the bearing ring is removably secured in place by means of a nut 9, which cooperates with a shoulder 10 to hold the bearing ring 7 in fixed relation to the tracer bar. The outer or right hand end 11 of the tracer bar is enlarged and provided with a screw threaded socket 12, in which a tracer point 13 may be screwed. This construction, it will be understood, will facilitate the ready removal of a tracer point 13 or the substitution of one shape or size of tracer point for another when desired. It will be observed, in Fig. 1 of the drawings, that the supporting annular bearing member 3 is made cylindrical at 14, to the left of the spherical portion, so that the tracer bar 8 may be displaced longitudinally while being properly supported at its fulcrum by the bearing between the members 7 and 3. By this construction, it will readily be seen that the tracer point is adapted for universal lateral movement in any direction and for longitudinal movement with the tracer bar as a whole.

The opposite end 15 of the tracer bar is preferably provided with a finger 16, mounted axially thereof and provided with a rounded end 17, seated in a socket block 18, as indicated in Fig. 1 of the drawings. The socket block 18 is preferably made of steel and hardened; and the socket therein is preferably conical in shape, the angle being such as to give substantially the same amount of motion, to the block 18 for equal movements of the finger 17 in any lateral direction, from its normal position. The block 18 is preferably mounted in the short arm 19 of a contact carrying lever 20, which is pivoted at 21 on suitable cone screws 22, supported in bearing lugs 23, as will be seen in Figs. 3 and 4 of the drawings. The lower end 19 of the lever 20 is split as indicated in Figs. 1 and 3 of the drawings, and is provided with a screw 24 for clamping the socket member 18 therein. The contact carrying member 20 may be made af aluminum or other suitable material as desired.

The bearing lugs 23 are mounted upon or integral with a supporting block in the form of a cap 25, screw threaded at 26 on to the left end of the tracer barrel or body 1, as will be seen in Fig. 1 of the drawings. The cap 25 is provided with a central hole at 26, through which the finger 16 protrudes, the hole being large enough to permit any necessary lateral movement of the finger. Screw threaded into the block or cap 25 are, preferably, three pillars 27 which support, upon their outer ends, a plate 28, the latter being held to the posts or pillars 27 by suitable screws 29, as will be seen in Figs. 1 and 2 of the drawings.

In order to hold the tracer bar 8 in normal axial position, and closely seated on the ball socket bearing 3, a compression spring 30 is provided, one end of which, in the present instance, is shown as engaging the socket member 18 through a hole in the lower arm 19 of the contact carrying lever, while the opposite end of the spring thrusts against a block 31, slidably mounted in a tubular support 32, which, as will be seen in Fig. 1, is secured to the plate 28 by being screwed thereinto and held by a lock nut 33. The slidable thrust member or block 31 is mounted on the lower end of a screw 34, threaded through the supporting member 32 and provided with a lock nut 35, thereby providing a means for adjusting the tension of the spring 30.

It is found desirable, in order to overcome any sluggishness, to supplement the action of the spring 30, and this is accomplished by attaching an extension spring 36 to an eye 37 in the upper arm of the lever 20, as shown in Fig. 1 of the drawings, the opposite end of the spring 36 being hooked into the end of a screw 38, sliding longitudinally in a tubular supporting member 39, which is mounted upon the plate 28 and held thereto by lock nut 40. The screw 38 is preferably prevented from rotation by a pin 41, so that when the nut 42 is screwed down against the outer end of the supporting member 39, the tension of the spring 36 may be increased. A suitable lock nut 43 is provided for clamping the screw 38 in any adjusted position.

The contact carrying lever 20 is provided with a circuit closing contact at 44, cooperating with a contact 45 mounted on the end of a screw 46 threaded into a suitable tubular support 47, and held in any adjusted position by a lock nut 48, as will be seen in Fig. 1 of the drawings. The contact 45 is suitably insulated from the plate 28 by the insertion of insulating bushings and washers at 49, between the tubular member 47 and the plate 28, as shown in Fig. 1 of the drawings. A connecting strip 50 is clamped by means of the nut 51 to the supporting member 47 and extends laterally, as will be seen in Fig. 2 of the drawings, and is preferably secured to a binding post 52 of the usual construction, to which the circuit wire may be suitably secured. If the circuit through the contacts 44 and 45 and the lever arm 20 and bearing screws 22 is not sufficiently good, a cross-over connection may be formed by a short wire 53, as shown in Fig. 1 of the drawings, the circuit thereby being completed or grounded through the body 1 of the tracer, which of course, may be suitably supported on the machine with which it cooperates.

It was explained, in my pending application, above referred to, that it is desirable to protect the apparatus by providing circuit breaking means, which will be brought into operation by excessive movement of the tracer point and bar. In the present instance, this may be accomplished by providing the upper end of the contact carrying lever 20, with a fiber plug 54, adapted to engage a contact carrying arm 55, which is preferably pivoted at 56 in a bracket 57, secured upon the cap block 25, but suitably insulated therefrom, as indicated at 57ª in Fig. 3 of the drawings. The contact carrying arm 55 is preferably provided with a contact at 58, cooperating with a contact 59 mounted on the end of a screw 60, threaded through the tubular support 61 and held in proper adjusted position by a lock nut 62, substantially as shown in Fig. 1. The contact 59 and tubular support 61 are suitably insulated from the plate 28, by bushing and washers 63 and are connected by means of a laterally extending connecting strip 64, held in place by a nut 65 substantially similar to that previously described, with respect to the contact member 45. As will be seen in Fig. 2 of the drawings, the connecting strip 64 extends to the left and is connected with a binding post 66 with which the circuit wire may be connected in the usual way. A spring 67 is adapted to thrust the contact carrying arm 55 toward the left, as seen in Fig. 1, and thereby hold the contacts 58 and 59 closed under normal operating conditions. However, it will be seen that excessive movement, either longitudinal or lateral of the finger 16, as a result of corresponding movements of the tracer point 13, the contact lever 20 will be thrown far enough over for the fiber plug 54 to engage the arm 55 and break the circuit through the contacts 58 and 59. The circuit through the contact arm 55 may be completed by clamping a wire under the screw 68, shown in Figs. 3 and 4 of the drawings, the bracket 57 being secured to the cap member 25 by the screws 69, which pass through suitable insulating bushings and washers for insulating the bracket 57 from the cap 25.

It will be understood that the cone-like socket of the block 18 in the contact carrying lever 20, operating upon the rounded end of the finger 17, under the pressure of the spring 30 is adapted to restore the finger and hence the tracer point 13 to normal position, and hold it there until displaced by contact of the tracer point with a portion of the pattern. As previously stated, it will be understood also that the size and shape and length of the tracer points 13 which may be required for different jobs may vary considerably and as the different tracer points are different weights, the tracer bar arms may not balance and thus will not give as sensitive control as may be desired. In order that the tracer bar may be properly balanced, so that any difference of weight in the tracer points may be adjusted, so as to equalize the arms of the tracer bar, a spring 70 (see Figs. 3 and 4) is preferably provided to engage the upper side of the finger 16, as shown in Fig. 1 of the drawings. The spring 70 is preferably in the form of a finger or leaf spring and may be secured by a screw 71 to a slotted block or adjustable plate 72, mounted on the side of the rectangular face of the cap 25, as shown in Figs. 2, 3 and 5 of the drawings. The adjustable plate 72 is held in place by a pin 73, and a threaded stud 74, the latter being provided with a clamp nut 75, whereby the slotted plate 72 may be adjusted up and down in order to vary the tension of the spring finger 70 upon the tracer bar finger 16, according to the balance required by the weight of the particular tracer point 13, attached to the tracer bar 8.

In using my electric tracer, in connection with some forms of machines, it is desirable at times, to control auxiliary circuits and, obviously, any number of levers or contact carrying members may be provided, in suitable position to be operated by the tracer bar finger 16. In Fig. 5 of the drawings, I have shown a slight modification in which the contact carrying lever 55 is provided with an inserted fiber block 76, carrying a contact 77, cooperating with a contact 78 on the contact bar 20, the fiber plug 54 being eliminated, so that the contact pressure between the contacts 77 and 78 will break the circuit between the contacts 58 and 59. The contact 77 is connected by the screw 79 with a connecting wire 80, suitably secured to the lower side of a binding post 81, mounted on the plate 28, as shown in Fig. 5 of the drawings. By this modified arrangement, it will be seen that when the circuit between the contacts 44 and 45 is broken, another circuit may be closed through the contacts 77 and 78 and excessive pressure on the latter will break the circuit through the contacts 58 and 59.

From the above, it will be understood that with my improved tracer bar, the operating finger of which is directly connected to the tracer point, I have evolved an extremely sensitive instrument, which, in its movements, may be adapted to closely control the automatic feed of various types of machines, by means of suitable electro-magnet clutches, such as that shown and described in my prior application, hereinbefore referred to. It will be understood that I do not wish to be limited to the particular construction shown and described, for obviously, the tracer bar finger may be utilized for operating various forms of contact carrying members variously arranged in relation thereto for controlling a plurality of circuits to vary the feed or speed of operation of any particular type of machine to which the tracer may be adapted, and to thereby control the relative feed and depth of cut that may take place between the cutter and work, while reproducing in the work the form of the pattern which is followed by the tracer. Therefore, I do not wish to be limited to the specific details of construction, for obviously, various modifications may be made herein, without departing from the spirit and scope of the invention.

I claim:—

1. An electric tracer, comprising a tracer bar, secured to one end of which there is a tracer point, and to the other end an operating finger, means for pivotally supporting said bar between its ends for lateral and longitudinal movement of both the tracer point and finger, and members carrying circuit closing contacts, adapted to be operated by said finger, said contacts being opened and closed by lateral and longitudinal movements of said finger by contact of the tracer point with the pattern.

2. An electric tracer, comprising a tracer bar having a tracer point secured to one end and an operating finger to the other end thereof, a bearing support between the tracer point and said finger so arranged as to permit lateral and longitudinal movement of both the tracer point and finger, and a member carrying a circuit closing contact operative by said finger, the circuit being opened and closed as an incident to the lateral and longitudinal movement of the ends of said tracer bar by contact of the tracer point with the pattern.

3. An electric tracer, comprising a tracer bar provided with a tracer point at one end and an operating finger at the other end thereof, a ball and socket bearing for said tracer bar, between the ends thereof, to permit universal lateral movement of the tracer point and finger, said bearing being arranged to also permit longitudinal movement of the tracer bar, a member controlling circuit closing contacts mounted in position to be moved by lateral or longitudinal movement of said finger, and resilient means for restoring it to and holding said tracer bar in normal position.

4. In an electric tracer, the combination with a tracer bar, fulcrumed between its ends, of a ball and socket bearing at the fulcrum of said bar, said socket being provided with a cylindrical extension to permit longitudinal displacement of said bar, a tracer point at one end of said bar, an operating finger at the other end thereof, a pivoted contact carrying lever cooperating with said finger, the arrangement being such that any lateral or longitudinal movement of said finger will be transmitted to the contact lever to control the opening and closing of the contacts and a spring cooperating with said contact lever to restore the same and said bar to normal position.

5. In an electric tracer, the combination with a tracer bar fulcrumed between its ends, one end of said bar being provided with a tracer point and the other with a finger for operating a contact carrying lever, means for removably attaching the tracer point to the bar, so that tracer points of different shapes and lengths may be attached thereto and means for couter-balancing the weight of said tracer point, so as to equalize the arms on each side of the fulcrum.

6. In an electric tracer, the combination with a tracer bar fulcrumed between its ends, of a tracer point removably attached at one end thereof, an operating finger at the other end of said bar for cooperating with contact carrying members adjustable means for counterbalancing the weight of the tracer point and thereby equalize the arms on each side of the fulcrum.

7. In an electric tracer, the combination with a supporting body portion of a tracer bar fulcrumed therein, so as to permit universal lateral movement of the respective ends thereof and longitudinal movement of the bar as a whole, a contact finger at one end of said bar, a tracer point at the other end of said bar, a pivoted contact carrying lever provided with a socket cooperating with the end of said finger, said socket and finger being so shaped that lateral movement of the finger from normal position will rock said lever and break said contact.

8. In an electric tracer, the combination with a tracer bar, provided with a tracer point at one end and an operating finger at the other end, said bar being fulcrumed between its ends, of a contact lever carrying a contact normally closed when said bar is in normal position, operating connections between said finger and said contact lever whereby any movement of said finger out of normal position is effective to break said contact, and a second contact operated by said bar to close when the first named contact is open.

JOHN C. SHAW.